United States Patent [19]

Makel et al.

[11] Patent Number: 5,077,821

[45] Date of Patent: Dec. 31, 1991

[54] MEANS FOR COUPLING A COHERENT FIBER-OPTIC BUNDLE TO AN ELECTRO-OPTICAL SENSOR

[76] Inventors: David D. Makel, P.O. Box 391, Nellysford, Va. 22958; William H. Shoup, 2739 McElroy Dr., Charlottesville, Va. 22903; Lawrence H. Gilligan, 3022 Colonial Dr., Charlottesville, Va. 22901

[21] Appl. No.: 611,409

[22] Filed: Nov. 9, 1990

[51] Int. Cl.⁵ .................................................. G02B 6/08
[52] U.S. Cl. .................................... 385/120; 385/116; 250/227.24
[58] Field of Search ............... 350/96.15, 96.20, 96.22, 350/96.17, 96.24, 96.25, 96.27; 250/227.14, 227.15, 227.17, 227.24, 227.26, 552; 357/17, 19, 30, 74, 80

[56] References Cited

U.S. PATENT DOCUMENTS

| | | | |
|---|---|---|---|
| 3,712,724 | 1/1973 | Courtney-Pratt | 350/96.27 X |
| 4,674,834 | 6/1987 | Margolin | 350/96.24 X |
| 4,702,552 | 10/1987 | Margolin | 350/96.25 |
| 4,762,391 | 8/1988 | Margolin | 350/96.24 X |
| 4,918,304 | 4/1990 | Gordon | 250/227.26 |
| 5,029,975 | 7/1991 | Pease | 350/96.27 |

Primary Examiner—John D. Lee
Assistant Examiner—Phan T. Heartney
Attorney, Agent, or Firm—Keith F. Goodenough

[57] ABSTRACT

The present invention is directed to an apparatus and method for coupling a coherent fiber-optic bundle to an electro-optical sensor. This invention provides accuracy and durability of coupling in operating conditions characterized by vibrations, shocks and fluctuating temperatures and pressures. It also reduces the reject rate previously experienced in such assembly work. The apparatus and method of the present invention employ a rigid guide plate for initiating and in most cases preserving transverse and angular alignment of the component bundle and sensor, and a transparent flexible cement to establish the correct proximity between the electro-optical sensor and the fiber-optic bundle and to achieve permanent mating of those two components. In certain applications the rigid guide plate can be dispensed with after assembly and curing of the cement.

13 Claims, 4 Drawing Sheets

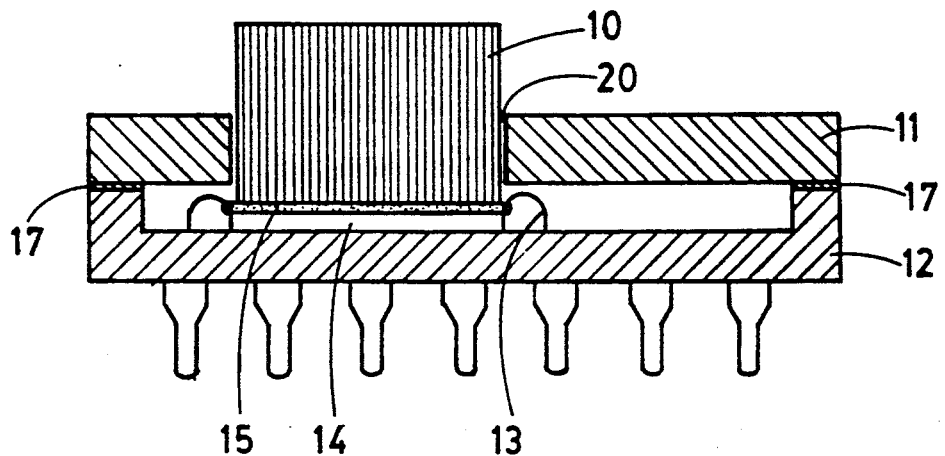
FIG. 2
FIG. 3
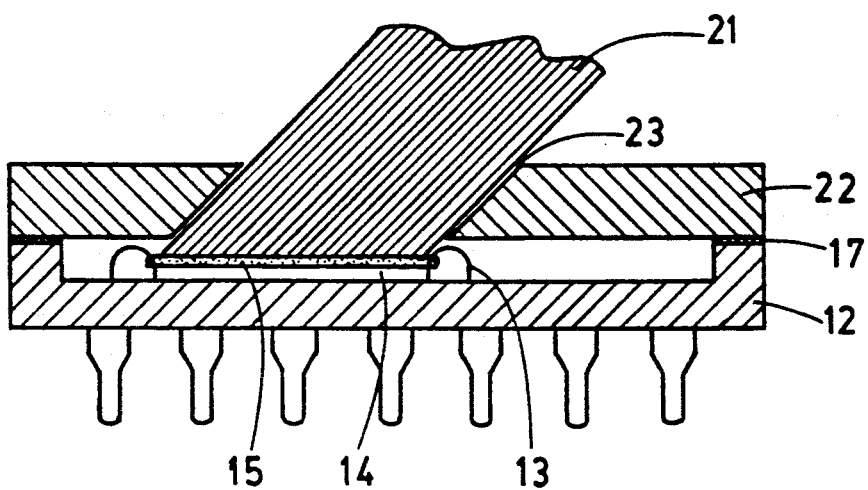

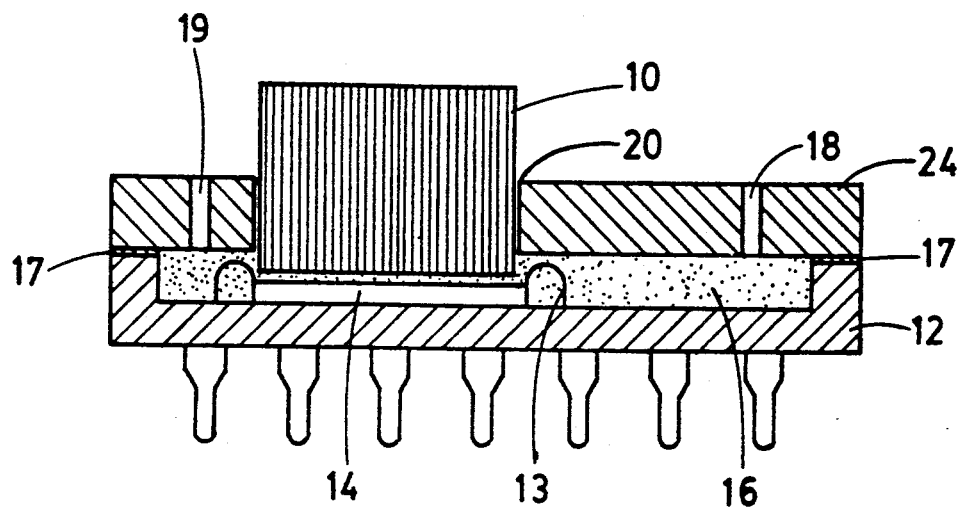
FIG. 4
FIG. 5
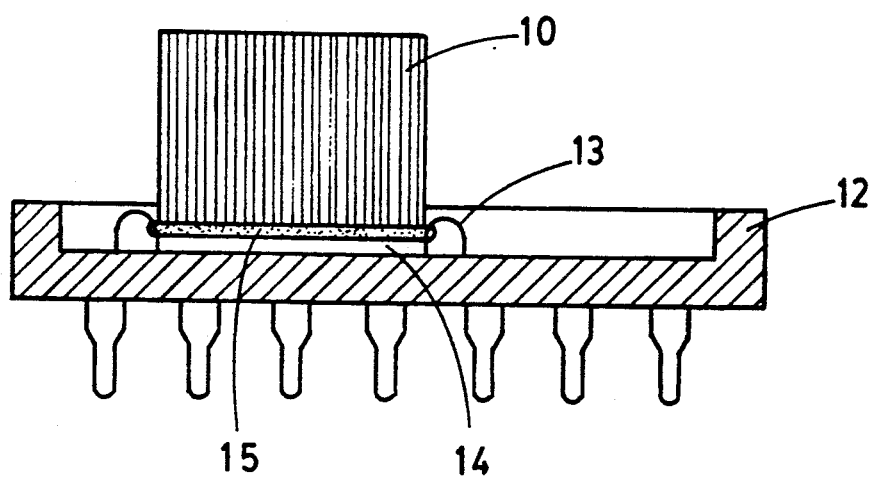

MEANS FOR COUPLING A COHERENT FIBER-OPTIC BUNDLE TO AN ELECTRO-OPTICAL SENSOR

BACKGROUND OF THE INVENTION

1. Field of the Invention

The present invention generally relates to an apparatus and method useful for attaching one end of a coherent fiber-optic bundle to an electro-optical sensor. The present invention is particularly useful for accurately positioning the end of the fiber-optic bundle with respect to the face of the electro-optical sensor and retaining the bundle end permanently in place in the presence of vibrations, shocks and fluctuating temperatures and pressures. More particularly, the present invention provides a method of accurately positioning and attaching the end of the fiber-optic bundle to the electro-optical sensor by means of a rigid guide plate and transparent flexible attachment medium, avoiding damage to the sensor under adverse operating conditions.

2. Description of the Background

It is desirable to couple light signals to an electro-optical sensor through a coherent fiber-optic bundle as a substitute for a complex imaging system and in circumstances where the source of reflected or generated light is, for example, at a remote location from the sensor, at a location which is difficult of access for the sensor, or at a location where the environment would damage the sensor. The distal end of the bundle receives the light signals from the light source and the proximal end transmits the light signals to the sensor. The fiber-optic bundle is constructed such that a light signal incident upon the distal end of the bundle is delivered in the desired form to the bundle's proximal end surface. This surface is positioned to be mated with the light sensitive surface of the sensor and to deliver the signal to the desired area or areas of the sensor surface. To those skilled in the art it is obviously desirable that the relative positions of the bundle's proximal light-transmitting end and the light-sensitive surface of the sensor must be accurately maintained under operating conditions which may include shocks, vibrations and fluctuating temperatures and pressures, so that the light signal transmitted to the sensor consistently represents the light received by the distal end of the fiber-optic bundle. It is particularly undesirable for the light-transmitting end surface of the bundle directly to contact the light sensitive surface of the sensor, as such contact could result in damage, but the two surfaces must be in close parallel proximity to maintain resolution and to avoid light signal degradation.

Previous attempts to align a fiber-optic bundle accurately and to assemble the combination of the fiber-optic bundle end and sensor have resulted in a high reject rate for such assemblies, due in part to the difficulty of maintaining alignment during the assembly process, to damaging direct contact between the bundle end and the sensor during assembly, and to the choice of coupling media. Further, there has been a general failure to manufacture such assemblies which maintain the necessary light signal quality delivered to the sensor surface during normal operating conditions which may include shocks, vibrations and temperature or pressure fluctuations. Previous attempts to maintain such alignment have included transparent rigid cement and transparent fluid as coupling between the bundle and sensor. Rigid cements have failed because they do not provide adequate damping or relief of the stresses due to vibrations, temperature or pressure fluctuations, or other forces applied between the bundle and sensor. Liquid couplings have failed because of the degradation of the liquid, bubbles therein, and leaks in the liquid containment device. Further, liquid couplings do not control the proximity of the sensor and bundle surfaces. U.S. Pat. No. 4,182,545 teaches a non-permanent optical coupler system in which the coupling is of individual fibers, in contrast to the fiber-optic bundle coupled by the present invention, without use of the transparent flexible cement which results in the durability and operational permanence granted by the present invention. U.S. Pat. No. 4,790,620, although also teaching an optical coupling device, likewise does not teach the use of a transparent flexible cement for attaching a coherent fiber-optic bundle to an electro-optical sensor, discloses coupling only of an optical fiber, not a fiber-optic bundle as here, and is without the rigid guide plate of the present invention. Also, U.S. Pat. No. 4,790,620 does not teach the quality of proximity for coupling light; rather it depends upon a reflective surface added to the outer surface of the cement.

Finally there has been a rapidly expanding long felt but unfulfilled need for assemblies of fiber-optic bundles and electro-optical sensors which can be produced with a very low or non-existent reject rate, which are robust, and which maintain accuracy of operation in adverse operating conditions.

SUMMARY OF THE INVENTION

The present invention provides a new and improved apparatus and method for assembling and attaching coherent fiber-optic bundles to electro-optical sensors, and for maintaining the accuracy of alignment of such assemblies during operation, even in adverse conditions.

The means of attachment according to the present invention, comprises an accurately constructed rigid guide plate which is placed, and may be rigidly cemented, in position on the chip carrier on which the electro-optical sensor is installed, there being in the rigid guide plate a hole of which the perimeter is of a size and shape to give a close axial sliding fit to the fiber-optic bundle, and which is accurately aligned with the perimeter of the area or areas of the sensor to which it is desired that light be introduced. A coherent fiber-optic bundle is conventionally provided with a polished end cut generally transversely or angularly to the transverse, though the end may not necessarily be planar but formed to mate parallel with the non-planar surface of any particular form of sensor. The end of the fiber-optic bundle, the perimeter of the bundle end being a close axial sliding fit within the rigid guide plate hole, is slid through the rigid guide plate hole so that its surface approaches parallel to and is held in near proximity to the desired light-sensitive surface of the sensor. The means of attachment according to the present invention further comprises a transparent, flexible, non-reactive cement which adheres to and provides a bond between the bundle end and the surface of the sensor, and which may preferably in cases where the rigid guide plate is left in place fill any space remaining between the rigid guide plate and the chip carrier. Alternatively, in applications where the operating conditions permit, the rigid guide plate may be removed and the flexible cement remain as the sole attaching element bonding the fiber-optic bundle to the electro-optical sensor.

In a presently preferred embodiment, the present invention overcomes the problem of accurate alignment by means of an accurately constructed rigid guide plate through which the end of the fiber-optic bundle is slid during assembly, and which is held in alignment with the sensor by rigid cement, or, in another version of the preferred embodiment, where there is a space provided by the shape of the sensor chip holder or of the rigid guide plate, by flexible cement filling the space. Further, in a presently preferred embodiment, the present invention overcomes the problem of maintaining alignment in use by employing the combination of rigid guide plate, which laterally locates the fiber-optic bundle and insures parallel approach of the proximal bundle end to the electro-optical sensor, and a quantity of transparent flexible non-reactive cement between the bundle end and sensor surfaces, or, in another version of the preferred embodiment, where operating conditions permit, by the flexible cement alone where the rigid guide plate has been removed after the curing of the flexible cement. The flexibility of the cement tends to absorb shocks, vibrations and the changes in relative dimensions of the bundle and the sensor caused by fluctuations in temperature or pressure. Thus the present invention fulfills the expanding and long felt need for a means of accurately attaching fiber-optic bundles to electro-optical sensors which will maintain alignment during adverse operating conditions.

These and other meritorious features of the present invention will be more fully appreciated from the following description and claims.

BRIEF DESCRIPTION OF THE DRAWINGS

FIG. 2 is a cross-sectional view of the coupling means in accord with the present invention showing the assembly of FIG. 1 completed wherein a rigid guide plate is attached to the outer rim of a chip carrier in which an electro-optical sensor is installed, and a quantity of transparent flexible cement attaches a fiber-optic bundle to the sensor leaving a peripheral space;

FIG. 3 is an exemplary cross-sectional view of an alternative embodiment of the present invention showing a fiber-optic bundle coupled to an electro-optical sensor where the angle of approach of the axis of the bundle to the surface of the sensor is other than of ninety degrees;

FIG. 4 is a cross-sectional view of an alternative version of the preferred embodiment of this present invention showing a rigid guide plate attached to the outer rim of a chip carrier where a quantity of transparent flexible cement is arranged to fill the peripheral space of FIG. 2;

FIG. 5 is a cross-sectional view of a further alternative version of the preferred embodiment of this invention showing a fiber-optic bundle attached to an electro-optical sensor by transparent flexible cement after removal of the rigid guide plate used in the assembly thereof.

All figures are schematic and are not drawn to scale. If a given feature is shown in more than one figure then the same numeral is used to identify the feature in all the figures. While the invention will be described in connection with the presently preferred embodiment, it will be understood that it is not intended to limit the invention to this embodiment. On the contrary, it is intended to cover all alternatives, modifications and equivalents as may be included in the spirit of the invention as defined in the appended claims.

DETAILED DESCRIPTION OF THE PREFERRED EMBODIMENT

This invention relates to the coupling of a coherent fiber-optic bundle to an electro-optical sensor.

In some circumstances it is advantageous to transfer an image or other optical signal on to the surface of an electro-optical sensor by employing a coherent fiber-optic bundle rather than a system of lenses. To preserve the quality of the optical image the coherent fiber-optic bundle must be held in close proximity, defined for the purposes of this description and the appended claims as at a distance of less than ten microns, to the electro-optical sensor surface. However, many problems have arisen in the coupling of fiber-optic bundles to electro-optical sensors. Mechanical assembly processes used hitherto have resulted in a high reject rate due partly to the difficulty of maintaining accurate alignment in the assembly process, to damaging direct contact between the bundle and the sensor during the assembly process and to the choice of coupling media. In operation also problems have been experienced with rigid coupling media, such as epoxy resin, in that they do not provide adequate damping of physical shocks or vibrations or relief of dimensional changes caused by temperature or pressure fluctuations. Liquid coupling media have tended to fail because of bubbles, leaks and chemical degradation, together with the fact that they have no control over the proximity of the sensor and bundle surfaces.

The present invention avoids the problem of alignment between the bundle and the sensor, both during the assembly process and during use, by using a novel combination of a rigid guide plate and transparent flexible cement, thereby, in contrast with other current assembly methods, giving a permanent coupling durable in adverse operating conditions.

Figure 6:
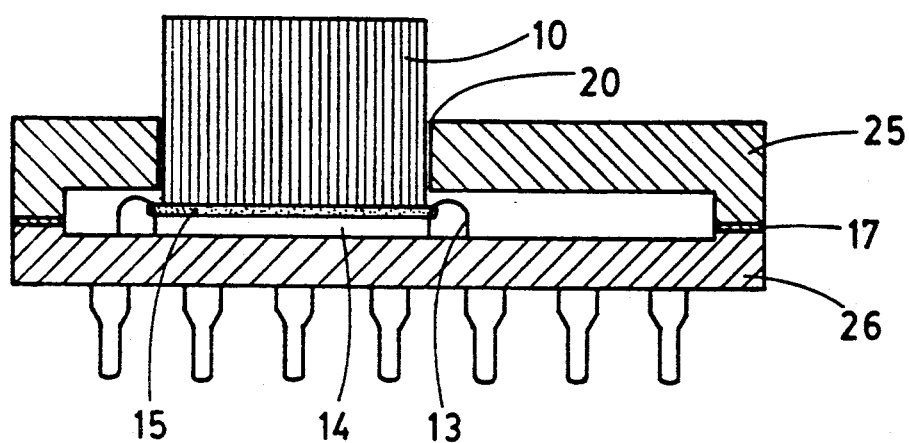
FIG. 6 is an exemplary cross-sectional view of the preferred embodiment of the present invention similar to that illustrated in FIG. 2 but in which the rigid guide plate has a peripheral supporting rim at a lower level than that of the central area of the guide plate.

For purposes of simplification of this specification without in any way affecting the adequacy of description of this invention, FIGS. 1 through 5 and descriptions thereof in this description of the preferred embodiment refer to the chip carriers upon which the electro-optical sensors are conventionally mounted as being of the type with, in each case, the carrier having a periphery raised above the plane of the light-sensitive surface of the sensor. Further, in FIGS. 2, 3, 4 and 6 the outer edges of the rigid guide plates and the chip carriers are shown for convenience as meeting flush with each other, which is a matter not within the scope of the present invention, but may be for adjustment after coupling in accord with this invention has been made. In FIG. 6 is illustrated a version of the rigid guide which has a peripheral supporting rim, applied to a chip carrier with a peripheral rim lower than the sensor thickness. However, this invention encompasses couplings of fiber-optic bundles with electro-optical sensors where either the guides or the chip carriers have no raised supporting rims, where there is no permanent chip carrier, where the sensors are two-dimensionally or three-dimensionally connected to their circuits, and where the sensors are mounted, for example, on printed circuit boards. Within the scope of this invention there may also be multiple fiber-optic bundles coupled to multiple portions of the same or different electro-optical sensors.

Figure 1:
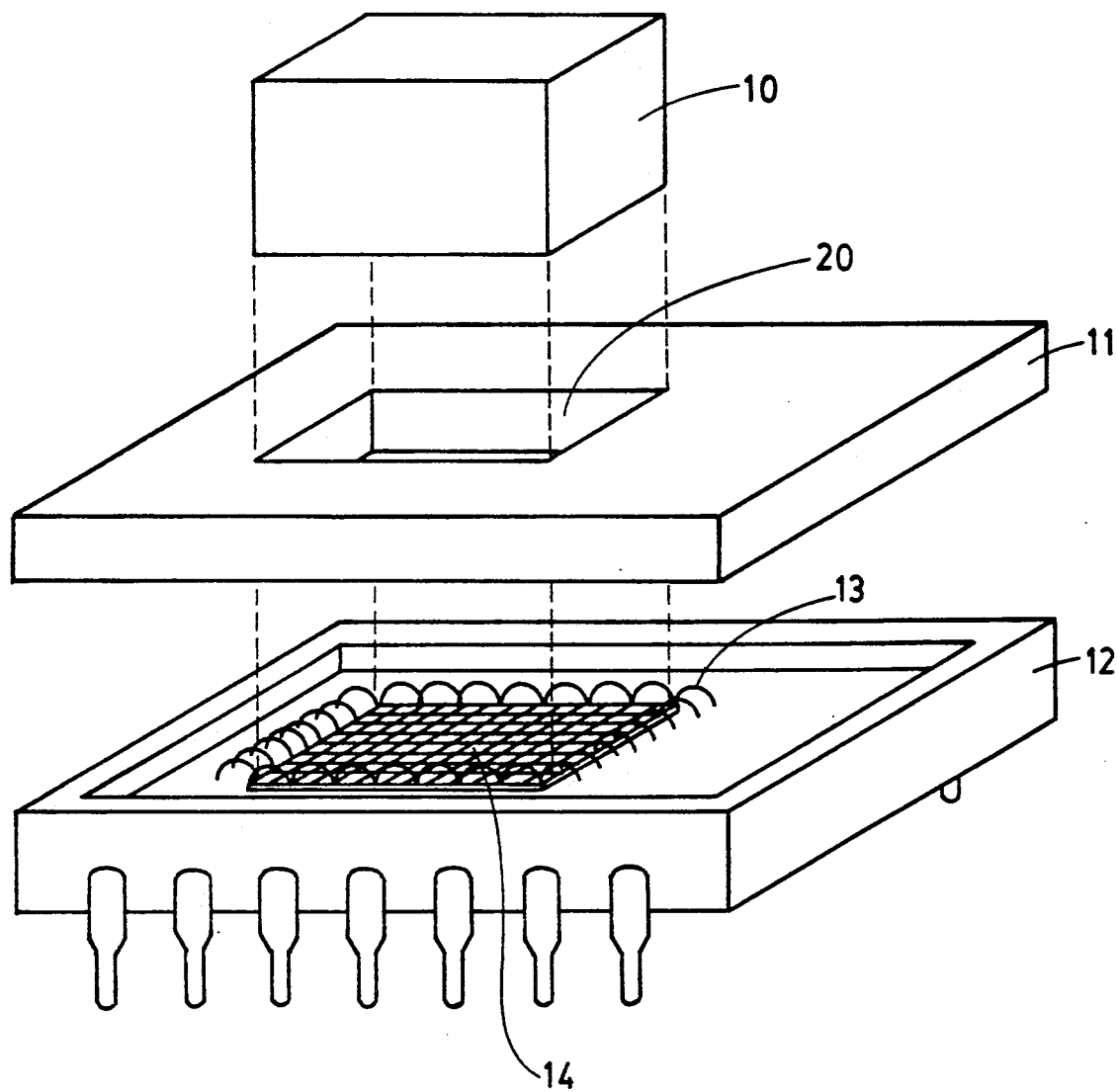
FIG. 1 is a exemplary perspective illustration of a mode of assembling a fiber-optic bundle to an electro-optical sensor in accord with the present invention.

In FIG. 1 fiber-optic bundle 10 is shown in a position to be slid through hole 20 which has been formed axially through rigid guide plate 11, the hole 20 being transversely sized and shaped to provide a close axial sliding fit for fiber-optic bundle 10, and positioned in rigid guide plate 11 so as to be in alignment with sensor 14 as positioned on chip carrier 12. FIG. 1 further shows rigid guide plate 11 and the hole 20 axially therethrough aligned with electro-optical sensor 14 attached by conventional means to and supported by chip carrier 12 and electrically connected in conventional fashion to the pins thereof by fine conductive wires 13. It will be appreciated by those skilled in the art that alignment of rigid guide plate 11 with chip carrier 12 gives at least rough alignment of hole 20 with sensor 14, and hence of sensor 14 with bundle 10. Any final adjustment of alignment necessary between hole 20, and thence the bundle slid therethrough, and sensor 14 may be made with the aid of a low-powered microscope. It is a novel feature of all versions of the preferred embodiment of the present invention that the use of the rigid guide plate facilitates adjustment of the proximal end of the fiber-optic bundle so that it is parallel, and in close proximity to, and mates with, but, because of the intervening transparent flexible cement, is not permitted to touch directly the surface of the electro-optical sensor. If such touching occurs, there is a higher probability that the sensor will be damaged, such damage being a main reason for the afore-mentioned high rejection rate of couplings made by means heretofore available in the art. After alignment between hole 20 and sensor 14, rigid guide plate 11 is fixed with respect to chip carrier, by rigid cement 17 as shown in FIG. 2, and, in an alternative preferred case where it is desired that rigid guide plate 11 could removed after assembly, by clamps, for example. For clarity in FIG. 1, none of the transparent flexible cement shown in FIGS. 2, 3, 4, 5, and 6 is shown as yet having been applied to any element.

FIG. 2 illustrates a completed coupling of a fiber-optic bundle 10 mated to and coupled with electro optical sensor 14, showing bundle 10 passing through hole 20 in rigid guide plate 11 and bonded to sensor 14 by transparent flexible cement 15. In the arrangement shown in FIG. 2 rigid guide plate 11 is attached to chip carrier 12 by cement or other means 17. The arrangement illustrated in FIG. 2 is particularly useful where eventual removal of the guide plate 11 from the chip carrier 12 may be required.

FIG. 3 shows an exemplary view of a completed coupling which may be required in certain applications where the fiber-optic bundle 21 lies at an angle other than ninety degrees to the plane of the light-sensitive surface of the electro-optical sensor 14. To accommodate the angle of the bundle rigid guide plate 22 is provided with a hole 23 which is at the same angle as the bundle 21 and the bundle end bonded by transparent flexible cement 15 is cut in a complementary fashion so as to be parallel to the sensor surface. It will be understood by those skilled in the art that the respective surfaces of the fiber-optic bundle and the electro-optical sensor to be mated may in some applications not be flat or planar. However, for undistorted transmission of light signals from the bundle to the sensor, such surfaces must be mutually parallel. Although such non-planar surfaces are not specifically illustrated in a drawing herein, it will be readily understood that the present invention is capable of mating any such non-planar surfaced components without significant adjustment.

By contrast with FIG. 2, FIG. 4 illustrates an alternative version of the preferred embodiment of the invention in which the transparent flexible cement 16 fills the space between rigid guide plate 24, provided with first hole 20 and second and third holes 18 and 19 respectively, and chip carrier 12. The purpose of holes 18 and 19 is to provide holes for injection of the transparent flexible cement after fiber-optic bundle 10 is in place in hole 20 and in alignment and close parallel proximity to sensor 14, and for expulsion of air displaced by such injection of cement, respectively. It will be appreciated that additional holes with similar functions to those of holes 18 and 19 can be provided in rigid guide plate 24 within the scope of this invention. The preferred embodiment as shown in FIG. 4 is particularly useful in applications where arduous operating conditions, involving for example heavy shocks and vibrations or temperature or pressure fluctuations, require the extra vibration and shock damping provided by the immersion of the components in flexible cement over the arrangement illustrated in FIG. 2.

FIG. 5 illustrates a version of the coupling of the present invention which is most useful in applications with miniature components and non-arduous operating conditions. In FIG. 5 fiber-optic bundle 10 is coupled to electro-optical sensor 14 by means of transparent flexible cement, the rigid guide plate used in assembly and up to the time of curing of the cement having been removed.

Referring to FIG. 2 for a presently preferred embodiment of the coupling apparatus in accord with the present invention, rigid guide plate 11 may be constructed of any conventional material of adequate durability according to the application for which the coupling according to the present invention is required, such as, but not limited to, metal, plastic or wax, but such material must be such that the surfaces of guide plate 11 may be accurately constructed to tolerances of, for example, 0.001 inch, and such that the perimeter and internal surface of hole 20 may be similarly accurately constructed so as to provide a close axial sliding fit with the outer surface or perimeter of fiber-optic bundle 10. Fiber-optic bundle 10 accordingly is accurately aligned by rigid guide plate 11 located on the periphery of conventional chip carrier 12, and is attached to the light-sensitive surface of electro-optical sensor 14 by a quantity of transparent flexible cement 15. The transparent flexible cement may, for example, be silicone based, but must be without components commonly found in such cements, such as acetic acid, which would attack the materials of the sensor or of the fiber-optic bundle. The transparent flexible cement used in the present invention when first in contact with the bundle and the surface of the sensor is in the form of a viscous liquid, but cures after a conventional period of time, or is cured by other conventional means, to a non-amorphous flexible state capable of attaching together within close parallel proximity the mating surfaces of the bundle and the sensor. The flexible state to which the cement cures is advantageous within the scope of the present invention in that the cement is able to dampen vibrations and shocks, prevent stress concentrations and compensate for changes in the dimensions of the mating surfaces due to temperature fluctuations to an extent not possible with a hardened or otherwise non-flexible coupling medium. Referring again to FIG. 2, the sensor 14 is conventionally connected to the pins of the chip carrier by fine electric-conducting wires 13 which in the preferred embodiment shown pass through the edge only of transparent flexible cement 15. By contrast, as shown in FIG. 4, in another preferred embodiment, the transparent flexible cement 16 fills the space between the chip carrier 12 and the rigid guide plate 24, and the fine wires 13 are submerged in the transparent flexible cement 16. The preferred embodiment shown in FIG. 4 is more durable than that of FIG. 2 and is particularly useful where operating conditions for the bundle 10 and sensor 14 include heavy shocks and vibrations.

The coupling apparatus according to the present invention is adapted in the preferred embodiment shown in FIG. 3 to effect coupling of fiber-optic bundle 21 with electro-optical sensor 14 where the angle of approach of bundle 21 towards the light-sensitive surface of sensor 14 is other than of ninety degrees. The end of bundle 21 mated with sensor 14 is cut to an angle complementary to that of the angle of approach so that the bundle end surface approaches and is mated parallel to the surface of sensor 14. Hole 23 in rigid guide plate 22 is cut to provide a close sliding fit to bundle 23 and to accommodate the angle of approach of bundle 21, which is slid therethrough and attached to the sensor 14 by transparent flexible cement 15. The preferred embodiment adapted as shown in FIG. 3 may be further adapted to an embodiment wherein the space between rigid guide plate 22 and chip carrier 12 is filled with transparent flexible cement similarly to that in the embodiment illustrated in FIG. 4, to provide greater durability. Means of attachment 17 of the rigid guide plate 11 to the chip carrier may be a cement or other attachment means which is non-reactive to the components according to the present invention.

As noted above, FIG. 4 illustrates an alternative version of the preferred embodiment in which the flexible cement 16 fills the space between rigid guide plate 24 and chip carrier 12. Rigid guide plate 24 has, in addition to first hole 20 through which fiber-optic bundle 10 is slid, second and third holes 18 and 19 respectively. Second hole 18 is provided so that the transparent flexible cement 16 can be injected therethrough into the space between plate 24 and carrier 12, and third hole 19 is provided so that the air displaced by such injection may be expelled therethrough. Other such injection and expulsion holes may be provided in rigid guide plate 24 and in different positions than those shown in FIG. 4, within the scope of this invention, so as more easily to effect even distribution of the transparent flexible cement 16. Rigid guide plate 12, fiber-optic bundle 24, chip carrier 12 and electro-optical sensor 14 are all in contact therefore with and mutually attached by transparent flexible cement 16, which arrangement contributes to the durability of the coupling when operating conditions involve heavy vibrations and shocks and temperature or pressure fluctuations. The end of bundle 10 is mated in close proximity to and parallel to the light-sensitive surface of electro-optical sensor 14. Means of attachment 17 of rigid guide plate 24 to the periphery of chip carrier 12 may be a rigid or flexible cement or other means non-reactive with the other components of the present invention.

FIG. 5 illustrates a preferred embodiment, particularly applicable to coupling small fibre-optic bundles to electro-optical sensors where the conditions of operation of the coupled assembly are not arduous. In FIG. 5 fibre-optic bundle 10 is attached by transparent flexible cement 15 to electro-optical sensor 14 which in turn is installed conventionally on chip carrier 12. However, no rigid guide plate is present since for this embodiment the guide plate is used to align bundle 10 with the sensor 14 during application and curing of cement 15, but after such curing is removed by detaching the guide plate from the chip carrier 12 and, for example, sliding the guide plate towards and over the distal end of the bundle 10.

FIG. 6 illustrates a version of the preferred embodiment in which rigid guide plate 25 is provided with a supporting rim for the case where chip carrier 26 has a raised periphery of insufficient thickness to accommodate the thickness of electro-optical sensor 14. Those skilled in the art will recognize that this version of the preferred embodiment will accommodate arrangements for supporting sensor 14 in which the chip carrier has no raised periphery and those in which no separate chip carrier is provided, as in the direct mounting of the sensor on a printed circuit board.

Although it is believed that those skilled in the art will clearly understand the method of the present invention, this method is briefly summarized below with reference to the drawings. The method of the present invention as illustrated in FIGS. 1 and 2 comprises aligning hole 20 in rigid guide plate 11 with the portion of electro-optical sensor 14 to which fiber-optic bundle 10 is to be mated, the hole 20 being such as to provide a close axial sliding fit for bundle 10, so that the end of the fiber-optic bundle 10 when slid axially through the hole 20 approaches parallel to and in close proximity with the surface of sensor 14. It is a novel feature of all versions of the preferred embodiment of the present invention that the use of the rigid guide plate facilitates adjustment of the proximal end of the fiber-optic bundle so that it is parallel to but not permitted to touch the surface of the electro-optical sensor, because of the intervening transparent flexible cement. If such touching occurs, there is a high probability that the sensor will be damaged, such damage being a reason for the aforementioned high rejection rate of couplings made by means heretofore available in the art. The approximate alignment of hole 20 is conventionally made first by eye, and then more accurately adjusted by manipulation under a low-powered microscope. Further the method comprises fixing the position of the rigid guide plate in the alignment. Further the method comprises placing a quantity of transparent flexible cement 15 on the end of the bundle to be coupled. Alternatively within the scope of the present invention part of the quantity of transparent flexible cement 15 may be placed also on the surface of the electro-optical sensor. As a further alternative, the quantity of transparent flexible cement may be placed on the surface of the electro-optical sensor. The method then comprises sliding the end of the bundle 10 axially through the hole 20 so as to cement with transparent flexible cement 15 the end of the bundle 10 to the surface of sensor 14. Finally the quantity of transparent flexible cement 15 is cured by time or other conventional means. Referring to FIG. 5, an alternative method within the scope of the preferred embodiment of this invention comprises detachment from chip carrier 12 of the rigid guide plate 11 shown in FIG. 2 and removal thereof by, for example sliding guide plate 11 towards and over the distal end of the bundle 10. The removed guide plate 11 is then dispensed with or used for a further coupling operation. Referring to FIG. 4, a further alternative method within the scope of the preferred embodiment of this invention comprises, in addition to the method described with reference to FIGS. 1 and 2, filling the space between the rigid guide plate 24 and the chip carrier 12 with transparent flexible cement 16 by injecting cement 16 through hole 18 so that any air in the space is expelled through hole 19, so that rigid guide plate 24, fiber-optic bundle 10, electro-optical sensor 14 and chip carrier 12 are all mutually attached by cement 16. Those skilled in the art will readily understand that the methods of coupling illustrated in FIGS. 3 and 5 are essentially similar to that described above for FIGS. 1 and 2.

In the foregoing description of the present invention it is to be understood that the final operation of the coupling to which the invention is directed is the curing of the transparent flexible cement 15, 16, since without such curing the cement would lack the adhesive quality which provides the permanent shock-, temperature-, vibration-, and pressure-resistant nature of the coupling.

The foregoing description of the invention has been directed primarily to a particular preferred embodiment and method in accordance with the applicable statutes and for the purposes of explanation and illustration. It will be apparent, however, to those skilled in the art that modifications and changes in the specifically described apparatus and method may be made within the scope and true spirit of the present invention in addition to the alternative versions of the preferred embodiment and method described above. It is the applicants' intention in the following claims to cover such modifications and changes.

What is claimed is:

1. A method for coupling a coherent fiber-optic bundle having a distal end and a proximal end to the surface of an electro-optical sensor, where the sensor is mounted in a chip carrier having a periphery raised above the plane of the sensor surface, comprising:

for a rigid guide plate with a first hole therethrough, the dimensions of the hole being such as to provide a close axial sliding fit for the proximal end of the bundle, the rigid guide plate being of a size enough to cover the periphery of the chip carrier, and further having second and third holes therethrough for the injection of cement and the expulsion of air respectively, aligning the first hole with that portion of the electro-optical sensor to which the fibre-optic bundle is to be mated, and further so that the proximal end of the fiber-optic bundle when slid axially through the first hole approaches parallel to and in close proximity with the surface of the sensor;

fixing the position of the rigid guide plate in said alignment so as to cover the periphery of the chip carrier; filling any space between the rigid guide plate and the chip carrier by injecting transparent flexible cement through the injection hole so that the cement expels air from the space through the air expulsion hole;

sliding the proximal end of the bundle axially through the first hole into close parallel proximity to the surface of the sensor; and arranging curing of the cement, so as to cement the rigid guide plate to the chip carrier and the proximal end of the bundle to the surface of the sensor.

2. An apparatus for coupling a coherent fiber-optic bundle having a distal end and a proximal end to the surface of an electro-optical sensor, comprising:

a rigid guide plate with a hole therethrough for aligning the proximal end of the coherent fiber-optic bundle with the sensor surface when the proximal end of the fiber-optic bundle is axially slid through the hole into close proximity with the sensor, the dimensions of the hole being such as to provide a close axial sliding fit for the proximal end of the fiber optic bundle, and the axis and the alignment of the perimeter of the hole being so arranged that the proximal end of the fiber-optic bundle approaches in close parallel proximity to the surface of the sensor and is aligned with that portion of the electro-optical sensor to which the proximal end of the fiber-optic bundle is to be mated;

a means of fixing the position of the rigid guide plate in alignment with respect to the sensor; and a quantity of transparent flexible cement attaching to the sensor surface the proximal end of the fiber-optic bundle when slid through the hole in the guide plate.

3. The apparatus of claim 2 wherein the quantity of transparent flexible cement is such that the cement further functions so as to attach the rigid guide plate to a carrier supporting the electro-optical sensor.

4. The apparatus of claim 2 wherein the transparent flexible cement is silicone-based.

5. The apparatus of claim 2 wherein the rigid guide plate may further be removed from the bundle after curing of the cement.

6. An apparatus for coupling a coherent fiber-optic bundle having a distal end and a proximal end to the surface of an electro-optical sensor of the type which is mounted in a chip carrier having a periphery raised above the plane of the light-sensitive surface of the sensor, comprising:

a rigid guide plate with a hole therethrough for aligning the proximal end of the bundle with the sensor surface when the proximal end of the bundle is axially slid through the hole into close proximity with the sensor, the dimensions of the hole being such as to provide a close axial sliding fit for the bundle, and the axis and the alignment of the perimeter of the hole being such that the proximal end of the fiber-optic bundle approaches parallel to the surface of the sensor and is aligned with that portion of the electro-optical sensor to which the fiber-optic bundle is to be mated;

a means of fixing the position of the rigid guide plate in alignment on the periphery of the chip carrier; and a quantity of transparent flexible cement attaching to the sensor surface the proximal end of the bundle when slid through the hole in the guide plate.

7. The apparatus of claim 6 wherein the means of fixing the position of the rigid guide plate is a rigid cement.

8. An apparatus for coupling a coherent fiber-optic bundle having a distal end and a proximal end to the surface of an electro-optical sensor of the type which is mounted in a chip carrier having a periphery raised above the plane of the light-sensitive surface of the sensor, comprising:

a rigid guide plate with a first hole therethrough for aligning the proximal end of the bundle with the sensor surface when the proximal end of the bundle is axially slid through the first hole into close parallel proximity with the sensor, the dimensions of the first hole being such as to provide a close axial sliding fit for the bundle, and the axis and the alignment of the perimeter of the first hole being such that the proximal end of the fiber-optic bundle approaches parallel to the surface of the sensor and is aligned with that portion of the electro-optical sensor to which the fiber-optic bundle is to be mated, the rigid guide plate further being of such size and shape as to make contact with the periphery of the chip carrier, and further containing second and third axial holes for the injection of cement and expulsion of air respectively;

a means of fixing the position of the rigid guide plate in alignment on the periphery of the chip carrier;

means of preventing leakage of cement between the guide plate and the periphery of the chip carrier; and injected between the chip carrier and the guide plate, a quantity of transparent flexible cement attaching to the sensor surface the proximal end of the bundle when slid through the first hole in the guide plate, and filling all space between the rigid guide plate and the chip carrier so as to attach the rigid guide plate to the chip carrier.

9. A method for coupling a coherent fiber-optic bundle having a distal end and a proximal end to the surface of an electro-optical sensor, comprising:

for a rigid guide plate with a hole therethrough, the dimensions of the hole being such as to provide a close axial sliding fit for the proximal end of the bundle, aligning the hole with that portion of the electro-optical sensor to which the fibre-optic bundle is to be mated, and further so that the proximal end of the fiber-optic bundle when slid axially through the hole approaches parallel to and in close proximity with the surface of the sensor;

fixing the position of the rigid guide plate in said alignment;

placing a quantity of transparent flexible cement on the proximal end of the bundle to be coupled;

sliding the proximal end of the bundle axially through the hole into close parallel proximity to the surface of the sensor so that the cement is in even contact with the surface over an area thereof equal the proximal end of the bundle; and arranging for curing of the transparent flexible cement so that the end of the proximal end of the bundle is cemented to the surface of the sensor.

10. The method of claim 9 but further comprising removal of and dispensing with the rigid guide plate after curing of the cement.

11. A method for coupling a coherent fiber-optic bundle having a distal end and a proximal end to the surface of an electro-optical sensor, comprising:

for a rigid guide plate with a hole therethrough, the dimensions of the hole being such as to provide a close axial sliding fit for the proximal end of the bundle, aligning the hole with that portion of the electro-optical sensor to which the fibre-optic bundle is to be mated, and further so that the proximal end of the fiber-optic bundle when slid axially through the hole approaches parallel to and in close proximity with the surface of the sensor;

fixing the position of the rigid guide plate in said alignment;

placing a quantity of transparent flexible cement on the surface of the sensor to cover thereon an area equal to the proximal end of the bundle to be coupled;

sliding the proximal end of the bundle axially through the hole into close parallel proximity to the surface of the sensor so that the cement is in even contact with the proximal end of the bundle; and arranging for curing of the transparent flexible cement so that the end of the bundle is cemented to the surface of the sensor.

12. The method of claim 11 but further comprising removal of and dispensing with the rigid guide plate after curing of the cement.

13. A method for coupling a coherent fiber-optic bundle having a distal end and a proximal end to the surface of an electro-optical sensor, where the sensor is mounted in a chip carrier having a periphery raised above the plane of the light-sensitive surface of the sensor, comprising:

for a rigid guide plate with a hole therethrough, the dimensions of the hole being such as to provide a close axial sliding fit for the proximal end of the bundle, the rigid guide plate being of a size enough to cover the periphery of the chip carrier, aligning the hole with the portion of the electro-optical sensor to which the fiber-optic bundle is to be mated, and further so that the proximal end of the fiber-optic bundle when axially slid through the hole approaches parallel to and in close proximity with the surface of the sensor;

fixing the position of the rigid guide plate in alignment on the periphery of the chip carrier;

placing a quantity of transparent flexible cement on the proximal end of the bundle;

sliding the proximal end of the bundle axially through the hole into close parallel proximity with the surface of the sensor so that the cement contacts the surface of the sensor over an area equal to that of the proximal end of the bundle; and arranging curing of the cement so that the proximal end of the bundle is cemented to the surface of the sensor.

* * * * *